Jan. 9, 1962 G. HERRMANN 3,016,208

DRIVE MEANS FOR ELECTRICAL APPARATUS

Filed April 23, 1959 4 Sheets-Sheet 1

INVENTOR
GÜNTER HERRMANN

Wenderoth, Lind & Ponack
Attys.

Jan. 9, 1962 G. HERRMANN 3,016,208

DRIVE MEANS FOR ELECTRICAL APPARATUS

Filed April 23, 1959 4 Sheets-Sheet 2

INVENTOR
GÜNTER HERRMANN

Wenderoth, Lind & Ponack
Attys.

Jan. 9, 1962 G. HERRMANN 3,016,208

DRIVE MEANS FOR ELECTRICAL APPARATUS

Filed April 23, 1959 4 Sheets-Sheet 3

INVENTOR
GÜNTER HERRMANN

Wenderoth, Lind + Ponack
Attys

DRIVE MEANS FOR ELECTRICAL APPARATUS

Filed April 23, 1959 4 Sheets-Sheet 4

INVENTOR
GÜNTER HERRMANN

Wenderoth, Lind & Ponack
Attys.

United States Patent Office 3,016,208
Patented Jan. 9, 1962

3,016,208
DRIVE MEANS FOR ELECTRICAL APPARATUS

Günter Herrmann, 6 Gartenweg, Ronnenberg, Hannover, Germany

Filed Apr. 23, 1959, Ser. No. 808,467
Claims priority, application Germany Apr. 26, 1958
7 Claims. (Cl. 242—55.12)

This invention relates to drive means for electrical apparatus, for driving one or more constant-speed elements in at least one direction, suitable more particularly for magnetic sound recorders using wire or tape as a record carrier. The motor for the drive means is preferably an electric motor but it may be a clockwork motor of known construction. Interposed in known manner between the motor and the driving assembly which determines the speed of the constant-speed element, such as a spool spindle, is a resiliently coupled compensating flywheel mass.

In all electrical apparatus for recording and reproducing sound the speed of the record carrier must remain constant in order to avoid distortion of the recorded signal and of its reproduction. To this end use is generally made of speed-controlled motors and compensating flywheel masses between the motor and the actual element which imparts the constant feed speed to the record carrier.

In the case of record carriers in the form of a wire or tape unwound from one spool and rewound on another, the difficulty arises that the speed of the record carrier changes with changing diameter of the reel. The change is in direct ratio with the diameter of the reel. Experience has shown that the production of constant speed calls for the provision of complex regulating devices. In large apparatus such regulating means can be readily housed in the apparatus. But in small and miniature apparatus, especially in pocket size apparatus, the space available is usually too small, so that the provision of such regulating means must be dispensed with.

The present invention overcomes this difficulty and achieves a constant feed speed of the record carrier by driving the assemblies which produce the constant speed and the assemblies for taking up the transported wire or tape in parallel but entirely independently of one another by the same common motor. In electro-acoustic tape recorders, for instance, this permits the tape to be driven at constant speed by the motor which also drives the assembly for rotating the spool spindles. Special regulating means for the spool spindles can then be dispsensed with. There is then no objection to intermittent fluctuations in the speed of rotation of the spool spindles. Constant speed of the tape is always assured by the conventional transporting and pressure roller. The result is a driving assembly consisting of few structural parts and requiring a minimum of space.

In drive means for rewinding flexible record carriers the effective diameter of the reel may considerably differ at the beginning and at the end of the rewinding process and hence the speeds of the spools may differ considerably. To compensate these differences the driving assembly for taking up the transported wire or tape is arranged to comprise a driving wheel which is directly engageable through an adjustable slip coupling with a first spool spindle in forward feed, and a second driving wheel mounted loosely on the same spool spindle and engageable in reverse feed by an entraining element which responds in only one direction of rotation, said second driving wheel being permanently coupled with a second spool spindle. The entraining element may be a torsion spring which entrains the driving wheel in only one direction, but releases it in the other.

A further modification of the drive means according to the invention can be achieved in that in forward feed a pendulum brake which disengages in reverse feed, and that in reverse feed the slip coupling, act as the running brakes. In such a form of construction it is merely necessary that the pendulum brake should be appropriately set and adjusted.

An embodiment of the invention as applied to the drive means of a magnetic tape recorder is illustrated in the accompanying drawings in which.

Figure 1:
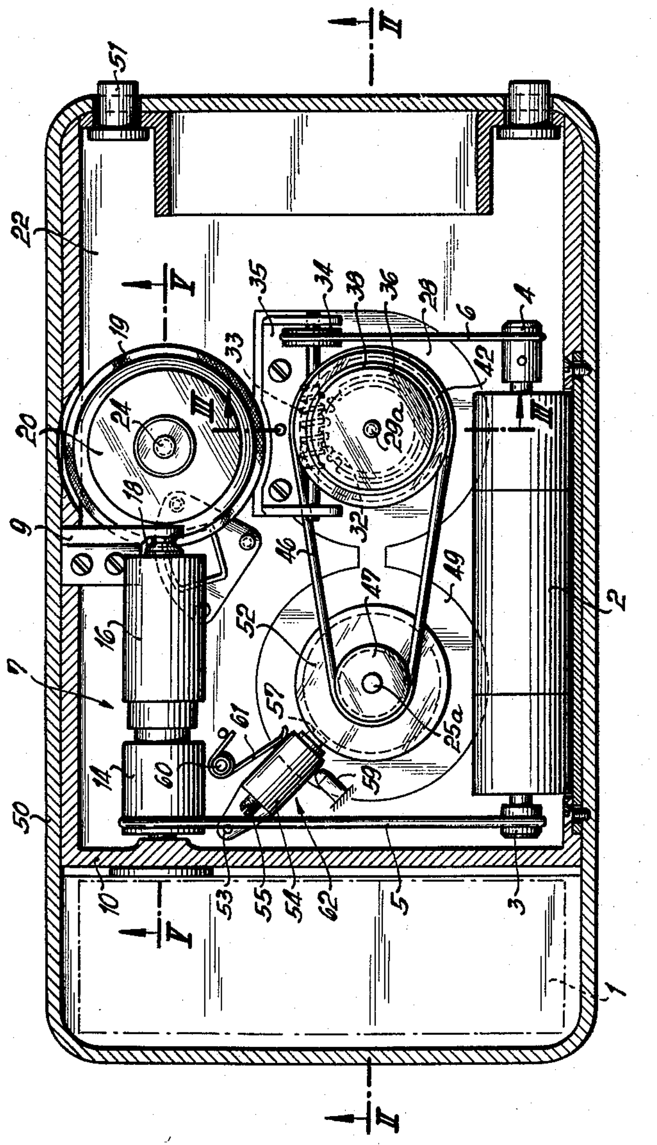
FIG. 1 is a plan view of the opened instrument seen from underneath.

With reference now to FIG. 1, an electric motor 2, fed by a battery 1 or some other suitable source of power, for instance the mains, is fitted with two synchronously revolving pulleys 3 and 4 mounted at opposite ends of its armature shaft. Through an elastic belt 5 pulley 3 drives the constant speed assembly, shown in detail in FIG. 5, for driving the tape driving roller which transports the tape, whereas pulley 4 through an elastic belt 6 drives the assembly shown in detail in FIGS. 2, 3 and 4 for driving the spools.

Figure 5:
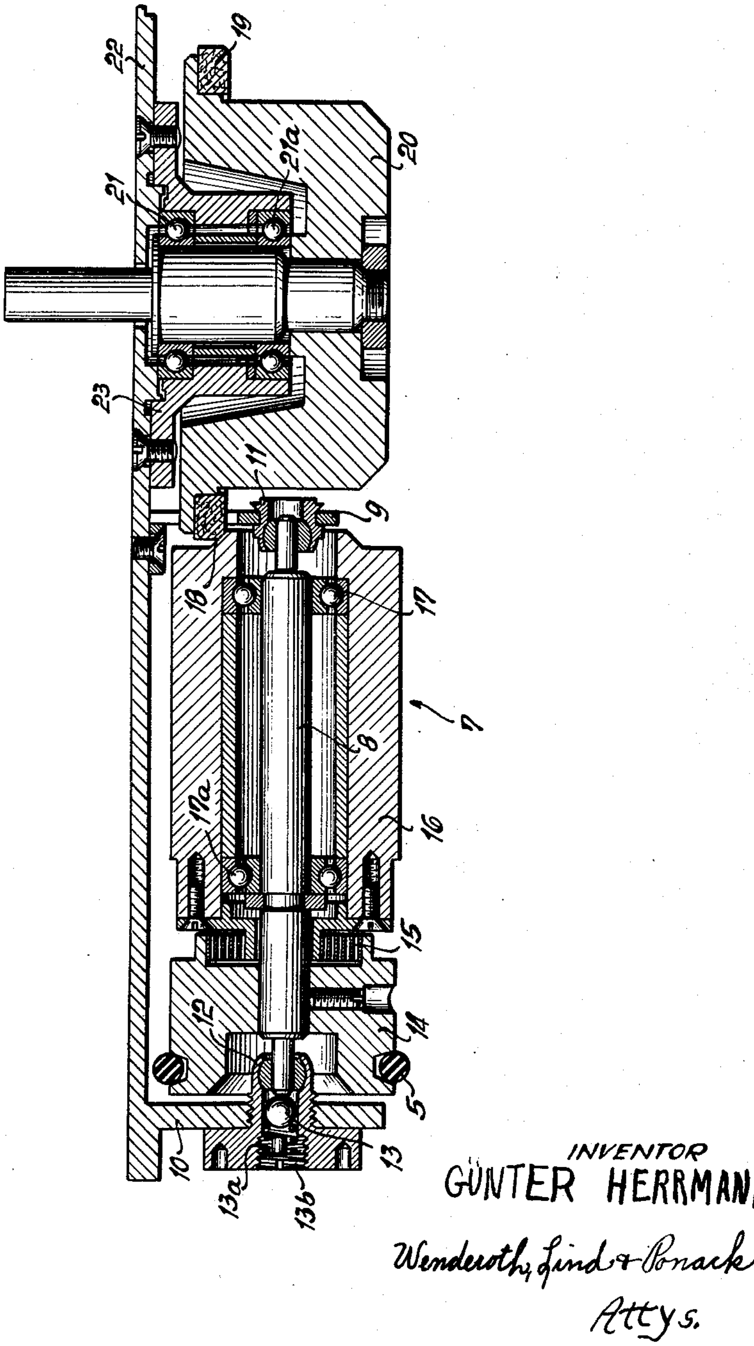
FIG. 5 is a larger scale vertical section taken on the line V—V in FIG. 1.

The constant speed assembly incorporates an elastic inertial balancing mass, indicated as a unit in FIG. 5 by reference number 7, and comprising a coupling roller mounted on a common shaft 8 of sectionally different diameters supported at each end in bearings 11 and 12 which are removably mounted in bracket members 9 and 10. The shaft 8 is axially adjustable by means of ball 13 which is elastically urged upon one shaft end through the adjusting screw **13*b* by spring 13*a*, if the other shaft end is also provided with an adjustable ball thrust bearing (not shown in the drawing) instead of in a simple cup-type bearing. A belt pulley 14 is keyed to the end of the shaft 8 and couples elastically with an inertial mass 16 through a spiral spring 15. The inertial mass 16 is rotatably mounted on shaft 8 in roller bearings 17, 17*a*, and its tapered end 18 engages a friction lining 19 on a flywheel 20 which is rigidly mounted on a shaft 24 running in ball bearings in a hub 23 secured to the tape deck 22. The head of shaft 24 carries the tape driving roller for driving the tape in conventional manner, which is not further illustrated in the drawing. Irregularities in the speed of the driving motor 2, due for instance to fluctuations caused by the action of a centrifugal contact governor, are compensated by the elastic serial connection of the elastic belt 5 balancing mass 16, an flywheel 20, so that the speed of revolution of the tape driving roller shaft 24** will be maintained substantially constant.

Figure 2:
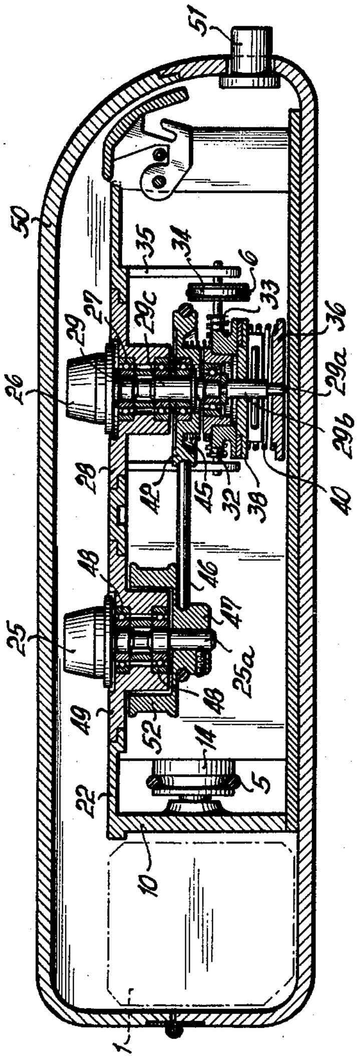
FIG. 2 is a section taken on the line II—II in FIG. 1.
Figure 4:
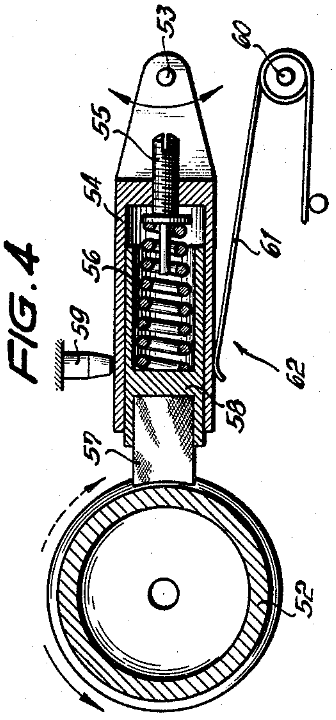
FIG. 4 is an axial horizontal section of the pendulum brake in the same plane as shown in FIG. 1, but on a larger scale.
Figure 3:
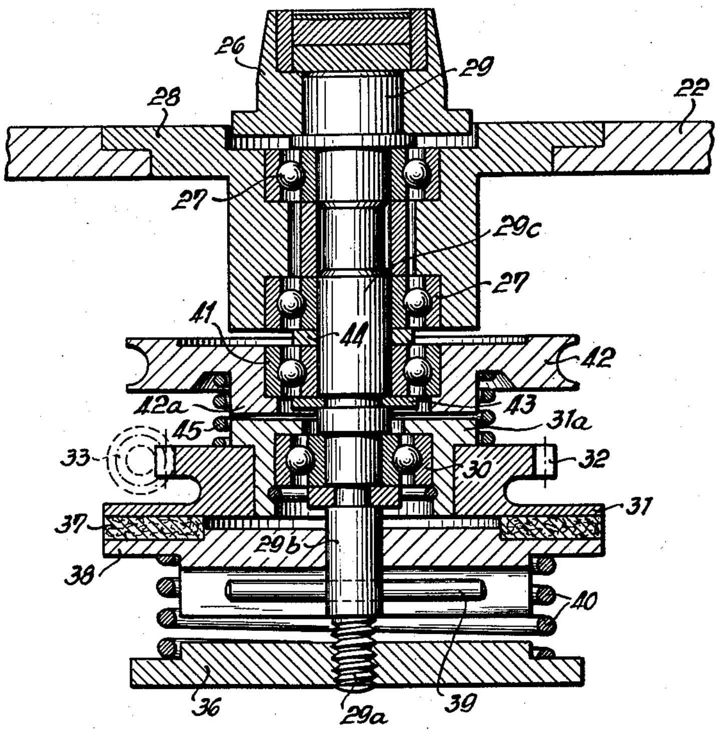
FIG. 3 is a section taken on the line III—III in FIG. 1.

The spool driving mechanism is shown in FIGS. 2 to 4 and comprises two spool heads 25 and 26 for the reception of the spools for winding the tape. According to FIG. 3, spool head 26 is rigidly mounted on a driving spindle 29 which is of varying diameter along its length and runs in ball bearings 27 in a hub 28 secured to the tape deck 22. The bottom end of the driving spindle 29 carries a driving wheel 31 which is rotatably mounted in ball bearings 30 on the spindle. The driving wheel 31 has a gear ring 32 which meshes with a worm shaft 33 driven by motor 2 through the elastic belt 6. The worm shaft 33 carries a pulley 34 (FIG. 1) for the belt 6 and is rotatably mounted in a bracket 35 affixed to the underside of the tape deck 22.

The lower extremity of the driving spindle 29 is threaded at **29*a* for adjustably mounting a plate 36. The spindle section 29*b* above its threaded end 29*a* carries a coupling disc 38 secured to the spindle with a key 39 and provided with an annular friction pad 37. Interposed between plate 36 and coupling disc 38 is a helical compression spring 40 which can be adjustably biased by means of plate 36**.

Spindle section **29*c* above the driving wheel 31 rotatably carries a pulley 42 in ball bearings 41, the pulley being axially held by a circlip 43 and a washer 44. Pulley 42 and driving wheel 31 are each formed with a hub 42*a* and 31*a*, respectively, the two hubs facing each other and being surrounded by a torsion spring 45. The pulley 42 is connected by an elastic belt 46 with a pulley 47 rigidly mounted on a second spool spindle 25*a* (FIG. 2). This second spindle 25*a* and its associated spool head 25 run in ball bearings 48 in the tape deck 22 or in a hub 49** detachably fitted to the tape deck.

This driving assembly functions as follows: When the instrument is switched on, say for recording, by the depression of a button switch 51 at one end of casing 50, motor 2 will start up. The tape driving roller shaft 24 is therefore rotated by elastic belt 5. The compensating inertial balancing mass and the flywheel maintain a constant speed of the pressure roller.

At the same time motor 2 rotates driving wheel 31 through elastic belt 6 and worm shaft 33, the driving wheel being coupled through the friction pad 38 with spool spindle 29 and spool head 26. Pulley 42 is disengaged from the driving wheel 31 and idles freely on section **29*c* of the driving spindle (FIG. 3). Consequently, spool spindle 25*a* (FIG. 2) and its spool head 25** can be freely rotated by the pull of the unwinding tape. The driving assembly now runs in a forward direction.

Figure 6:
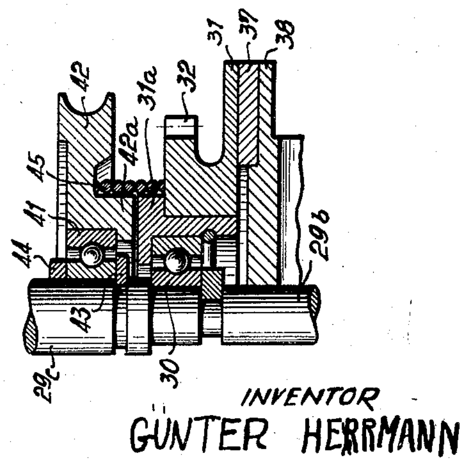
FIG. 6 is a part section of the assembly shown in FIG. 3, showing the entraining member in operative position.

For the return motion the polarity of the supply leads to the motor 2 is reversed and the motor will therefore run in the opposite direction of rotation. Consequently, the direction of rotation of spindle 24 and of the pressure roller will likewise be reversed as well as the direction of rotation of driving wheel 31. However, the torsion spring 45 between driving wheel 31 and pulley 42 now takes effect and couples the pulley 42 with the driving wheel 31 (FIG. 6). The pulley will therefore rotate spool spindle **25*a* and spool head 25, through the elastic belt 46, in a reverse direction. In other words, spool head 25 will now pull, whereas spindle head 26 will be freely entrained by the tension of the tape. The ratio of forward and reverse speeds can be suitably selected within wide limits by appropriately designing the relative diameters of pulleys 42 and 47**.

To ensure that rewinding is uniform and smooth the spool spindle 29 must revolve somewhat faster than (about 1.5 times as fast as) the speed of the tape. Otherwise the difference in the winding diameters at the beginning and the end of the rewinding operation cannot be compensated. Consequently the angular speed of the driving wheel 31 must always be greater than the angular speed of spool spindle 29. The difference in angular speeds is taken up by the slip coupling formed by the friction pads 37 on coupling disc 38.

Both ends of the torsion spring 45 are loose and its diameter is such that when the driving wheel 31 revolves contrary to the pitch of the spring the latter will just slide on the hubs **31*a* and 42*a* of the driving wheel 31 and the pulley 42 which it respectively embraces. However, as soon as the driving wheel 31** revolves in the direction of pitch of the spring the latter will immediately contract and tightly grip both the hubs.

During rewinding the slip coupling between driving wheel 31 and coupling disc 38 provides a friction brake for compensating differences in angular velocity between the two spool spindles.

The customary running brakes associated with the spool spindles have been replaced in the drive means according to the invention by a running brake 62 which acts only during the forward feed, and which is embodied in a pendulum brake which acts on an enlarged periphery 52 of pulley 47, and which, as shown in FIG. 4, consists of a sleeve member 54 pivotally fulcrumed in a horizontal plane on a pin 53. The sleeve member contains a cylindrical spring 56 which can be pre-compressed by an adjustable screw 55, and which yieldingly urges a small brake block 57 into contact with the periphery 52 of pulley 47 on spool spindle **25*a*. For guiding the brake block accurately the brake block proper is let into a cylinder 58 which is adapted to slide inside the sleeve 54. Deflection of the pendulum brake about pin 53 clockwise in FIG. 4 is limited by a rigid, preferably adjustable, stop 59, whereas deflection anti-clockwise is limited elastically by a hairpin spring 61 mounted on a stud 50. When pulley 47 revolves clockwise (return) the brake block 57 will be entrained and deflect the sleeve 54 anti-clockwise about pivot pin 53 against the yielding pressure of spring 61. The cylindrical spring 56 can thus expand and no braking action on pulley 47 will take place. During tape return braking is not required, because spool spindle 25*a* pulls the tape and spool spindle 26 is adequately braked by the slippage between the driving wheel 31 and coupling disc 38**.

I claim:

1. A drive mechanism for an electrical apparatus using a record carrier such as wire or tape, particularly for magnetic recorders, said drive mechanism comprising a shaft for driving a tape driving element at a constant speed, a flywheel rigidly mounted on said shaft, a balancing mass in slip connection with said flywheel, a pair of spool spindles, one connected to the other to be driven only when said one spool spindle is driven in one direction, and a single motor drivingly connected to said balancing mass and said one spool spindle, said balancing mass being freely rotatable over a wide range of speeds relative to said motor.

2. A drive mechanism as claimed in claim 1 in which the slip connection between said balancing mass and said flywheel is a speed reducing coupling, whereby said balancing mass rotates faster than said flywheel.

3. A drive mechanism as claimed in claim 2 in which the speed reducing coupling between said balancing mass and said flywheel is a friction slip clutch.

4. A drive mechanism as claimed in claim 1 in which said balancing mass comprises a pulley to which said motor is connected, and a rotating inertial mass, and a spiral spring connecting said pulley and said inertial mass for rotation of said inertial mass relative to said pulley over a wide range.

5. A drive mechanism as claimed in claim 1 in which said one spool spindle has a first driving pulley thereon to which said motor is connected, and a friction slip clutch between said first driving pulley and said one spool spindle, and a second driving pulley on said one spool spindle and connected to said other spool spindle to form the driving connection between said spool spindles, and an entraining element between said first driving pulley and said second driving pulley from said first driving pulley only when said first driving pulley rotates in said one direction.

6. A drive mechanism as claimed in claim 5 in which said entraining element is a cylindrical spiral spring, said driving pulleys each having a hub thereon around which said spring is positioned, whereby when the rotation is in said one direction the spiral spring is tightened to couple said pulleys.

7. A drive mechanism as claimed in claim 1 and a pendulum brake engageable with said other spool spindle when said other spool spindle rotates in the other direction, and is disengaged from said other spool spindle when said other spool spindle rotates in one said direction.

References Cited in the file of this patent

UNITED STATES PATENTS

| | | |
|---|---|---|
| 2,873,073 | Lekas | Feb. 10, 1959 |
| 2,898,055 | Genning et al. | Aug. 4, 1959 |